United States Patent
Tang

(10) Patent No.: US 9,933,653 B2
(45) Date of Patent: Apr. 3, 2018

(54) LIQUID CRYSTAL PANEL AND FABRICATING METHOD THEREOF

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 32 days.

(21) Appl. No.: 15/216,422

(22) Filed: Jul. 21, 2016

(65) Prior Publication Data
US 2017/0322448 A1 Nov. 9, 2017

(30) Foreign Application Priority Data
May 4, 2016 (CN) .......................... 2016 1 0288604

(51) Int. Cl.
*G02F 1/1339* (2006.01)
*G02F 1/1335* (2006.01)

(52) U.S. Cl.
CPC .... *G02F 1/133514* (2013.01); *G02F 1/13394* (2013.01); *G02F 1/133512* (2013.01); *G02F 1/133516* (2013.01); *G02F 2001/13396* (2013.01)

(58) Field of Classification Search
CPC ......... G02F 1/133514; G02F 1/133516; G02F 1/13394
USPC ......................................... 349/107
See application file for complete search history.

(56) References Cited

U.S. PATENT DOCUMENTS

| | | | | |
|---|---|---|---|---|
| 2001/0026347 A1* | 10/2001 | Sawasaki | .......... | G02F 1/133707 349/156 |
| 2004/0090582 A1* | 5/2004 | Ikeda | ................ | G02F 1/133514 349/130 |
| 2004/0114087 A1* | 6/2004 | Cho | ................... | G02F 1/133514 349/155 |
| 2005/0140914 A1* | 6/2005 | Sawasaki | ............ | G02F 1/13394 349/155 |
| 2007/0002263 A1* | 1/2007 | Kim | ..................... | G02F 1/13394 349/156 |
| 2009/0161046 A1* | 6/2009 | Tokuda | .................. | G02B 5/201 349/106 |
| 2009/0180043 A1* | 7/2009 | Rho | ..................... | G02F 1/13338 349/12 |

(Continued)

*Primary Examiner* — Christopher Raabe
(74) *Attorney, Agent, or Firm* — Andrew C. Cheng

(57) ABSTRACT

The present disclosure provides a liquid crystal panel and a fabricating method thereof. The liquid crystal panel has an array substrate, a color film substrate and a liquid crystal layer mounted between the array substrate and the color film substrate. The color film substrate forms multiple color resists thereon to form multiple color filter units. The array substrate at least forms a first spacer and a second spacer thereon. A height of the first spacer is equal to a height of the second spacer. A thickness of the color resist corresponding to the first spacer is different from a thickness of the color resist corresponding to the second spacer. The present disclosure simplifies a fabricating art, saves cost and effectively maintains a thickness of the liquid crystal panel at the time to ensure that the liquid crystal panel can clearly display image.

8 Claims, 8 Drawing Sheets

(56) References Cited

U.S. PATENT DOCUMENTS

| | | | |
|---|---|---|---|
| 2012/0242939 A1* | 9/2012 | Li | G02F 1/133514 |
| | | | 349/106 |
| 2012/0314163 A1* | 12/2012 | Joo | G02F 1/13394 |
| | | | 349/106 |
| 2015/0002793 A1* | 1/2015 | Jin | G02F 1/1333 |
| | | | 349/106 |
| 2015/0234224 A1* | 8/2015 | Jang | G02F 1/13394 |
| | | | 349/156 |
| 2017/0038636 A1* | 2/2017 | Yu | G02F 1/133514 |

\* cited by examiner

LIQUID CRYSTAL PANEL AND FABRICATING METHOD THEREOF

FIELD OF THE INVENTION

The present invention relates to liquid crystal display field, especially to a liquid crystal panel and a fabricating method thereof.

BACKGROUND OF THE INVENTION

As a development of liquid crystal display tending to high pixels per inch (PPI), a technique of low temperature polysilicon (LTPS) gradually replaces a technique of amorphous silicon.

The LTPS TFT array substrate generally employs an over coating flat layer, so the LTPS TFT array substrate does not like that the technique of amorphous silicon (without over coating) uses height differences among layers of an array substrate to form multiple photo spacers (PS) having the same height on a side of a color film substrate (CF) to form main PS and sub-PS structures. Therefore, LTPS usually needs a halftone technique to form the PSs with two different heights on the side of the CF to be used as the main PS and the sub-PS. If three PSs with different heights are required, a gray tone technique is employed to form the PSs with three different heights on the side of the CF to be used as the main PS, a first sub-PS and a second sub-PS.

Therefore, when the liquid crystal panel is made by the present technique, a complex fabricating art is required to form the PSs with different heights. In addition, using an expansive mask results a high fabricating cost, too.

SUMMARY OF THE INVENTION

The present invention provides a liquid crystal panel and a fabricating method thereof to overcome drawbacks of prior art including the complex fabricating art and high cost.

To overcome the above-mentioned drawbacks, the present invention uses one solution is: providing a liquid crystal panel. The liquid crystal panel has an array substrate, a color film substrate and a liquid crystal layer mounted between the array substrate and the color film substrate; wherein the color film substrate forms multiple color resists thereon to form multiple color filter units; the array substrate at least forms multiple first spacers and multiple second spacers, wherein a height of the first spacer is equal to a height of the second spacer; a thickness of the color resist corresponding to the first spacer is different from a thickness of the color resist corresponding to the second spacer.

Further, the thickness of the color resist corresponding to the first spacer is thicker than the thickness of the color resist corresponding to the second spacer; when pressures respectively forced to the color film substrate and/or the array substrate do not exceed a preset pressure, the first spacer touches to the color film substrate to support the color film substrate and the array substrate; and when the pressures respectively forced to the color film substrate and/or the array substrate exceed the preset pressure, both of the first and second spacers touch to the color film substrate to provide the color film substrate and the array substrate supporting functions.

Further, each of the first spacers or each of the second spacers only corresponds to one color resist in an extending direction of a touched surface between the first spacers and the color resists or between the second spacers and the color resists.

Further, when each of the first/second spacers corresponds to a boundary between the two different color filter units, a recess area is formed inwardly in the color resist of one of the two different color filter units, wherein the color resist corresponds to the first/second spacer, and the color resist of the other of the two different color filter units extends to the recess area, so that each of the first/second spacers only corresponds to another color resist in the extending direction of the touched surface.

Further, a thickness difference between the two different color resists with different thicknesses is 0.2 to 0.7 μm.

Further, the array substrate further forms a third spacer thereon, wherein a height of the third spacer is different a height of the second spacer, and a thickness of the color resist corresponding to the third spacer is the same as a thickness of the color resist corresponding to the first or second spacer.

Further, the array substrate further forms a third spacer thereon, wherein the third and second spacers have the same height and the third spacer corresponds to a black matrix on the color film substrate.

Further, the color resists has a red color resist, a green color resist and blue color resist; or has a red color resist, a green color resist, a blue color resist and a white color resist.

To overcome the above-mentioned drawbacks, the present invention uses another solution is: providing a fabricating method of the liquid crystal panel. The fabricating method has steps of: providing the array substrate and at least forming the first and second spacers, wherein the first and second spacers have the same height; forming the multiple different color resists on a substrate to form the multiple color filter units, wherein the color resists respectively corresponding to the first and second spacers have different thicknesses to form the color film substrate; and assembling the array substrate and the color film substrate to form the liquid crystal panel.

Further, the step of forming multiple different color resists on a substrate to form multiple color filter units, wherein the color resists respectively corresponding to the first and second spacers have different thicknesses to form the color film substrate has: in forming the multiple different color resists on the substrate to form the multiple color filter units, the color resist formed last is thicker than other color resists, wherein the color resist formed last is defined as a thick color resist; and removing a part of the thick color resist corresponding to the second spacer and reserving a part of the thick color resist corresponding to the first spacer.

The advantages of the present invention is: to distinguish prior art, by forming different color resists with different thicknesses on the color film substrate, the present invention can form the spacers with the same height on the array substrate, so the first and second spacers can be formed at the same time by one step of exposure and development with the same exposure intensity. The fabricating art is simplified, the cost is saved and the thickness of the liquid crystal panel is maintained to ensure that the liquid crystal panel clearly displays the images.

DETAILED DESCRIPTION OF THE PREFERRED EMBODIMENTS

In conjunction with the accompanying drawings and the following embodiments of the present invention are described in detail.

Figure 1:
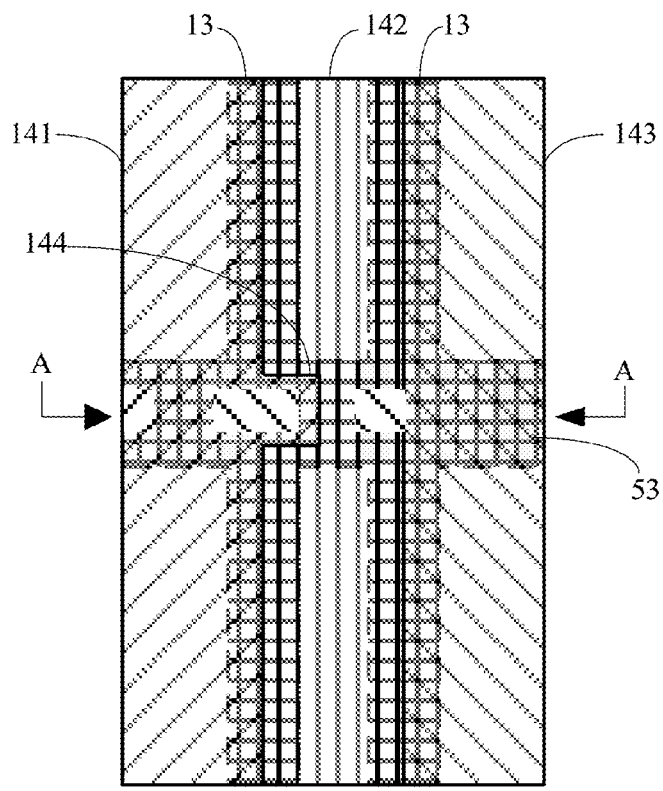
FIG. 1 is a structural schematic view of a first embodiment of a color film substrate of a liquid crystal panel of the present invention.
Figure 2:
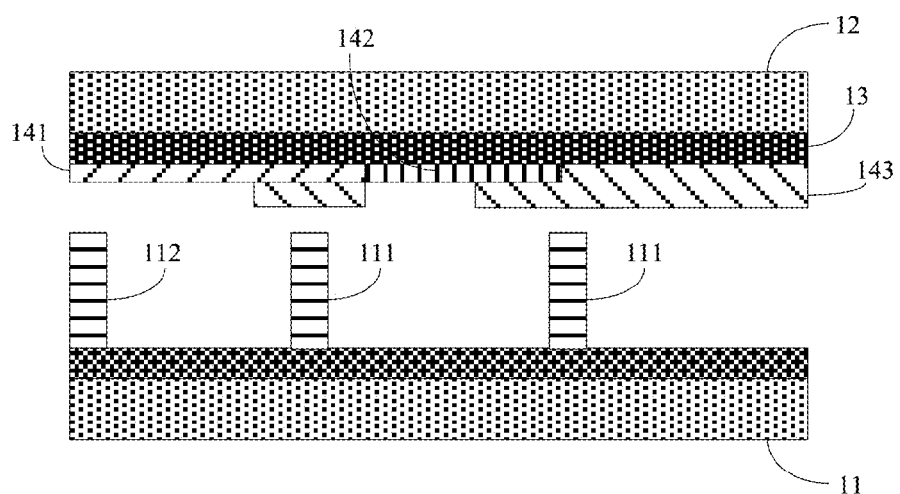
FIG. 2 is a cross sectional schematic view taken along line A-A line of FIG. 1.

With reference to FIG. 1 and FIG. 2, FIG. 1 is a structural schematic view of a first embodiment of a color film substrate of a liquid crystal of the present invention. FIG. 2 is a cross sectional schematic view taken along A-A line of FIG. 1.

The liquid crystal panel of the present invention has an array substrate 11, a color film substrate 12 and a liquid crystal layer (not shown in the drawing) mounted between the array substrate 11 and the color film substrate 12.

The color film substrate 12 has multiple color resists formed thereon and the color resists are formed to multiple color filter units. Particularly, the liquid crystal panel of the present embodiment is an RGB display mode. The color resists of the color film substrate 12 includes a red color resist 141, a green color resist 142 and a blue color resist 143. The red color resist 141 is formed to a red filter unit, the green color resist 142 is formed to a green filter unit and the blue color resist 143 is formed to a blue filter unit. Of course, in another embodiment, a white color resist may be further included, in addition to the above-mentioned color resists. The color film substrate 12 has a black matrix formed thereon. In a thickness direction of the color film substrate 12, the black matrix 13 is formed among the color filter units to separate the color filter units.

The array substrate 11 includes multiple TFT arrays, scanning lines, data lines and pixels defined by the scanning lines and data lines etc. structure and film layers. The array substrate 11 of the present invention at least has a first spacer 111 and a second spacer 112 formed thereon. A height of the first spacer 111 is the same as a height of the second spacer 112. Accordingly, the first and second isolations 111, 112 are formed at the same time by a regular photo-etching technique and a regular mask. A halftone technique is not required anymore to prevent using an expansive mask and complex fabricating steps of the half tone technique. Therefore, the present invention simplifies a fabricating art and saves cost of the mask. The first and second isolations 111 and 112 are used to support the array substrate 11 and the color film substrate 12. Accordingly, a thickness of the liquid crystal panel can be maintained to ensure that the liquid crystal panel clearly displays images.

A thickness of the color resist corresponding to the first spacers 111 is different from a thickness of the color resist corresponding to the second spacer 112. When pressures respectively forced on the color film substrate 12 and/or array substrate 11 are different, support functions respectively provided by the first and second spacers 111, 112 are different, too. Since the spacer corresponding to a thicker color resist is close to the color film substrate 12 and the spacer corresponding to a thinner color resist is farther from the color film substrate 12, the spacer corresponding to the thicker color resist touches the color film substrate 12 but the spacer corresponding to the thinner color resist does not touch the color film substrate 12 when each of the pressures does not exceed a preset pressure.

It should be noted that in another embodiment, when the pressures respectively forced on the color film substrate 12 and/or array substrate 11 do not exceed the preset pressure, the first and second spacers 111, 112 still touch the color film substrate 12, and the second spacer 112 just touches the color film substrate 12 but does not provide the support function.

When the pressures respectively forced on the color film substrate 12 and/or array substrate 11 exceeds the preset pressure, both of the first and second spacers 111, 112 touch the color film substrate 12. At the time, both of the first and the second spacer 111, 112 provide the support function.

To distinguish from the prior art, by forming the color resists with different thicknesses on the color film substrate 12 the present invention can form the spacers with the same height on the array substrate 11. Accordingly, the first and second spacers 11, 12 can be formed at the same time by one step of exposure and development with the same exposure intensity. The fabricating steps are simplified to save the cost and the thickness of the liquid crystal panel is maintained to ensure that the liquid crystal panel clearly displays the images.

Particularly, with further reference to FIG. 1 and FIG. 2, the black matrix 13 is formed on the color film substrate 12 in the present embodiment. The color resists are formed on the black matrix 13. In the present embodiment, the red color resist 141 and green color resist 142 has the same thickness, but the thickness of the blue color resist 143 is different from the thickness of the red color resist 141. The thickness of the blue color resist 143 is thicker than the thickness of the red color resist 141 and the thickness of the green color resist 142.

Further, the thickness of the color resist corresponding to the first spacer 111 is thicker the thickness of the color resist corresponding to the second spacer 112. That is, the first spacer 111 corresponds to the blue color resist 143 and the second spacer 112 corresponds to the red color resist 141. Of course, in another embodiment, the second spacer 112 may correspond to the red color resist 141 and/or the green color resist 142.

In the present embodiment, when the pressures respectively forced on the color film substrate 12 and/or array substrate 11 do not exceed the preset pressure, only the first spacer 111 touches the color film substrate 12 and provides the support function. At the time, the second spacer 112 does not touch the color film substrate 12 and does not provide the support function accordingly; or the second spacer 112 just touches the color film substrate 12 but does not provide the support function.

When the pressures respectively forced on the color film substrate 12 and/or array substrate 11 exceed the preset pressure, both of the first and second spacers 111, 112 touch the color film substrate 12 and both of the first and the second spacer 111, 112 provide the support function.

In addition, to increase a uniformity of positions of the first and second spacers 111, 112 corresponding to a side of the color film substrate 12, each of the first spacers 111 or each of the second spaces 112 only corresponds to one color resist in an extending direction of a touched surface between the first spacers 111 and the color resists or between the second spacers 112 and the color resists.

For example, when each of the first spacers 111 or each of the second spacers 112 corresponds to a boundary between two different the color filter units, a recess area is formed inwardly in the color resist of one of the two different color filter units, wherein the color resist corresponds to the first spacer 111 or the second spacer 112; and the color resist of the other of the two different color filter units extends to the recess area. Therefore, each of the first spacers 111 or each of the second spacers 112 only corresponds to another color resist in the extending direction of the touched surface.

Particularly, in the present embodiment, the red color resist 141 and the green color resist 142 have the same thickness. As shown in FIG. 1, one of the first spacers 111 corresponds to the boundary between the red and green filter units, the recess area 144 is formed inwardly (shown in a right side of FIG. 1) in the green color resist 142 of the green filter unit, wherein the green color resist 142 corresponding to the first space 111. The red color resist 141 of the red filter unit extends to the recess area 144, so that in the extending direction of the touched surface between the first space 111 and the corresponding color resist, the first spacer 111 only corresponds to the red color resist 141 but does not correspond to the green color resist 142 at the same time. Accordingly, the uniformity of positions of the first spacers 111 corresponding to the side of the color film substrate 12 is maintained.

It should be noted that, each of the first and second spacers 111, 112 only corresponds to one color resist in the extending direction of the touched surface between the first or second spacer and the color resist, but the number of the color resists are not limited in a vertical direction of the touched surface. For example, in the present embodiment, the first spacer 111 corresponds to the blue color resist 143 and the red color resist 141 at the same time in the vertical direction of the touched surface, as shown in FIG. 2.

A thickness difference between the two color resists with different thicknesses of the present invention is 0.2 to 0.7 μm, such as, 0.4 μm or 0.6 μm etc. In particular, the thickness difference is determined by a height difference required by the first and second spacers 111, 112. In the present embodiment, a blue color resist 143 is 0.5 μm thicker than the red color resist 141 or the green color resist 142.

Figure 3:
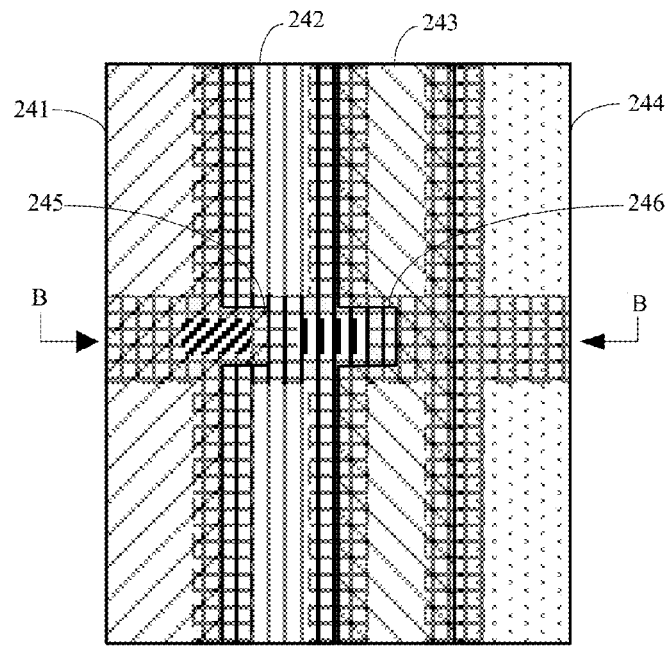
FIG. 3 is a structural schematic view of a second embodiment of the color film substrate of the liquid crystal panel of the present invention.
Figure 4:
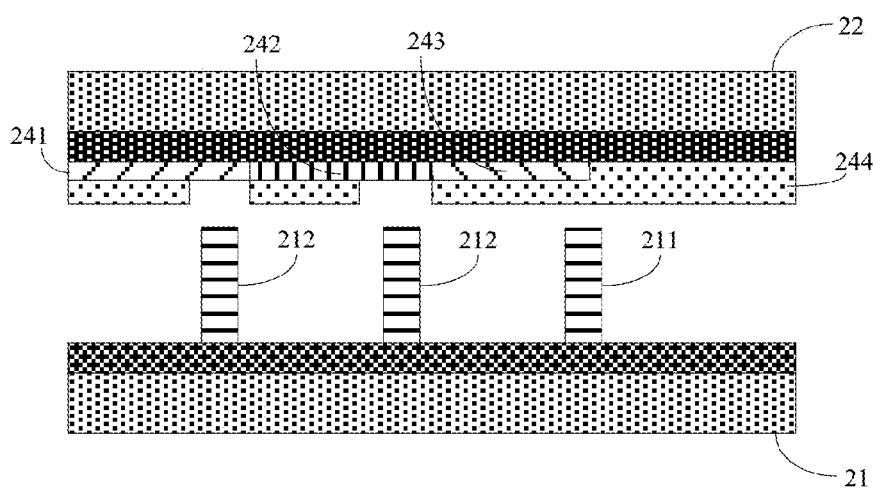
FIG. 4 is a cross sectional schematic view taken along line B-B line of FIG. 3.

With reference to FIG. 3 and FIG. 4, FIG. 3 is structural schematic view of a second embodiment of the color film substrate of the liquid crystal panel of the present invention. FIG. 4 is a cross sectional schematic view taken along B-B line of FIG. 3.

A difference between the present embodiment and the first embodiment is that the liquid crystal panel of the present embodiment is an RGBW display module. The color film substrate 22 has four different color resists formed thereon and including the red color resist 241, the green color resist 242, the blue color resist 243 and the white color resist 244. The red, green and blue color resists 241, 242, 243 have the same thickness and the white color resist 244 is thicker than the red color resist 241. For example, the white color resist 244 is 0.3 μm or 0.5 μm thicker than the red color resist 241. It should be noted that the white color resist 244 of the present invention may be used as a flat layer to provide the color film substrate 22 a flat face and to provide standing faces required by the first spacer 211 and the second spacer 212.

Further, the first spacer 211 corresponds to the white color resist 244 and the second spacer 212 corresponds to the red and green color resists 241, 242.

In the present embodiment, when pressures respectively forced on the color film substrate 22 and/or an array substrate 21 do not exceed the preset pressure, only the first spacer 211 touches the color film substrate 22 and provides the supporting function. At the time, the second spacer 212 does not touch the color film substrate 22 so the supporting function of the second spacer 212 is not provide, or the second spacer 212 just touches the color film substrate 22 but does not provide the supporting function.

When the pressure respectively forced on the color film substrate 22 and/or the array substrate 21 exceed the preset pressure, both of the first and second spacers 211, 212 touch the color film substrate 22 and provide the supporting functions.

To increase the uniformity of positions of the first and second spacers 211, 212 corresponding to the side of the color film substrate 22, in the extending direction of the touched surface between the first or second spacer 211, 212 and the color resists, each of the first spacers 211 or each of the second spacers 212 only corresponds to one color resist.

For example, in the present invention, the second spacer 212 corresponds to a boundary between the red and green filter units, a recess area 245 is formed inwardly (shown in a right side of FIG. 3) in the green color resist 242 of the green filter unit, wherein the green color resist 242 corresponds to the second spacer 212. The red color resist of the red filter unit extends to the recess area 245 so the second spacer 212 only corresponds to the red color resist 241 but does not correspond to the green color resist 242 at the same time. Accordingly, the uniformity of the position of the second spacer 212 corresponding to the side of the color film substrate 22 can be maintained.

Similarly, in the present invention, another second spacer 212 corresponds to a boundary between the green and blue filter units, a recess area 246 is formed inwardly (shown in the right side of FIG. 3) in the blue color resist 243 of the blue filter unit, wherein the blue color resist 243 corresponds to the second spacer 212. The green color resist of the green filter unit extends to the recess area 245 so the second spacer 212 only corresponds to the green color resist 242 but does not correspond to the blue color resist 243 at the same time. Accordingly, the uniformity of the position of the second spacer 212 corresponding to the side of the color film substrate 22 can be maintained.

When the pressures respectively forced on the color film substrate and/or array substrate exceed the preset pressure and the pressure possibly causes that the supporting functions of the two different spacers hardly maintain the thickness of the liquid crystal panel, three different spacers may be formed on the array substrate and include a first spacer, a second spacer and a third spacers. When the pressure causes that the supporting functions of the two different spacers hardly maintain a thickness of the liquid crystal panel, the pressure is set to a specific threshold. When the pressures respectively forced on the color film substrate and/or array substrate does not exceed the preset pressure, one of the three spacers provides the supporting function. When the pressures respectively forced on the color film substrate and/or array substrate exceed the preset pressure but do not exceed the threshold, two of the three spacers provide the supporting functions. When the pressures respectively forced on the color film substrate and/or array substrate exceeds the threshold, all of the three spacers provide the supporting functions. Details are described in following third, fourth and fifth embodiments.

Figure 5:
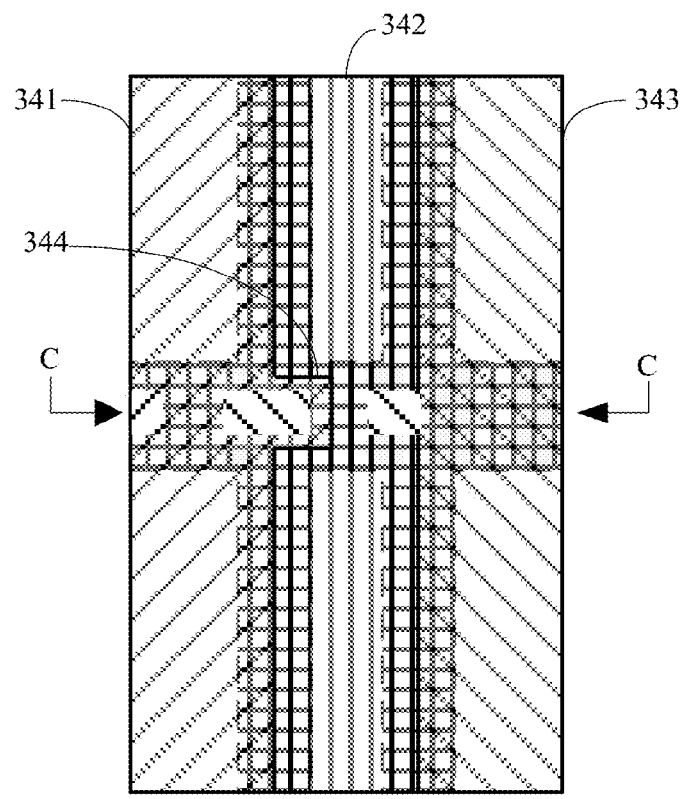
FIG. 5 is a structural schematic view of a third embodiment of the color film substrate of the liquid crystal panel of the present invention.
Figure 6:
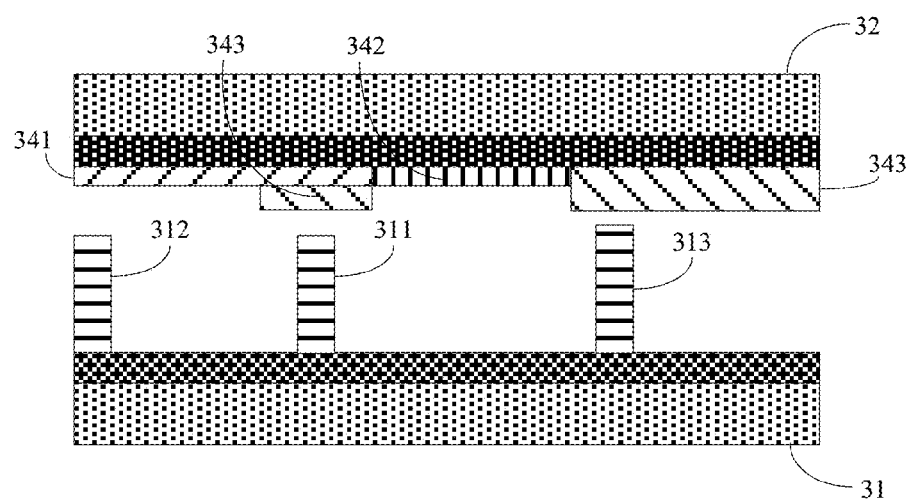
FIG. 6 is a cross sectional schematic view taken along line C-C line of FIG. 5.

With reference to FIG. 5 and FIG. 6, FIG. 5 is a structural schematic view of a third embodiment of the color film substrate of the liquid crystal panel of the present invention. FIG. 6 is a cross sectional schematic view taken along C-C line of FIG. 5.

The liquid crystal panel of the present embodiment is an RGB display mode, the color film substrate 32 of the liquid crystal panel has the red, green and blue color resists 341, 342, 343 formed thereon. The red and green color resists 341, 342 have the same thickness, and the blue color resist 343 is thicker than the red color resist 341.

The array substrate 31 has the first, second and third spacers 311, 312, 313 formed thereon. Further, the first and second spacers 311 and 312 have the same height. The blue color resist 343 corresponding to the first spacer 311 is thicker than the red color resist 341 corresponding to the second spacer 312.

The third spacer 313 is higher than the second spacer 312. The color resist corresponding to the third spacer 313 and the color resist corresponding to the first spacer 311 have the same thickness. In the present embodiment, the third spacer 313 corresponds to the thicker blue color resist 342. Of course, in another embodiment, the color resist corresponding to the third spacer 313 may be the same as the color resist corresponding to the second spacer 312.

In the present embodiment, a distance between the third spacer 313 and the color film substrate 32 is shortest, a distance between the first space 311 and the color film substrate 32 is longer than that between the third spacer 313 and the color film substrate 32 and a distance between the second spacer 312 and the color film substrate 32 is longest.

When the pressure respectively forced on the color film substrate 32 and/or the array substrate do not exceed the preset pressure, the third spacer 313 touches the color film substrate 32 and provides the supporting function. At the time, the second spacer 312 does not touch the color film substrate 32 and does not provide the supporting function. The first spacer 311 can just touch the color film substrate 32 but does not provide the supporting function, or the first spacer 311 may not touch the color film substrate 32.

When the pressures respectively forced on the color film substrate 32 and/or the array substrate 31 exceed the preset pressure and the preset pressure is less than the specific threshold, both of the third spacer 313 and the first spacer 311 touch the color film substrate 32 and provide the supporting functions. The second spacer 312 may touch the color film substrate 32 but does not provide the supporting function, or the second spacer 312 may not touch the color film substrate 32.

When the pressures respectively forced on the color film substrate 32 and/or the array substrate 31 exceed the specific threshold, the third, first and second spacers 313, 311, 312 touch the color film substrate 32 and provide the supporting functions.

By forming the three different spacers on the array substrate 31, the present embodiment makes that the liquid crystal panel can maintain the thickness thereof under a larger pressure and keeps a clarity of a display frame.

In addition, to increase the uniformity of positions of the first, second and third spacers 311, 312, 313 corresponding to a side of the color film substrate 32, in the extending direction of the touched surface between the first to third spacers 311, 312, 313 and the color resists, each of the first spacers 311, each of the second spacers 312 or each of the third spacers 313 only corresponds to one color resist.

For example, in the present embodiment, the red color resist 341 and the green color resist 342 have the same thickness. As shown in FIG. 5, a first spacer 311 corresponds to a boundary between the red filter unit and green filter unit and a recess area 344 is formed inwardly (shown in a right side of FIG. 5) in the green color resist 342 of the green filter unit, wherein the green color resist 342 corresponds to the first spacer 311. The red color resist 341 of the red filter unit extends to the recess area 344 to only correspond to the red color resist 341 in the extending face between the first spacer and the color resist but does not correspond to the green color resist 342. Accordingly, the uniformity of the position of the first spacers 311 corresponding to the side of the color film substrate 32 is maintained.

Figure 7:
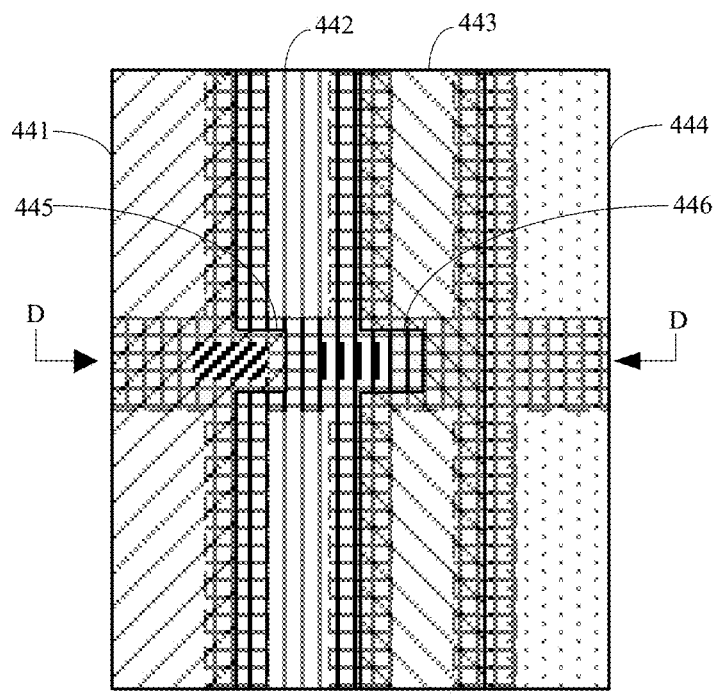
FIG. 7 is a structural schematic view of a fourth embodiment of the color film substrate of the liquid crystal panel of the present invention.
Figure 8:
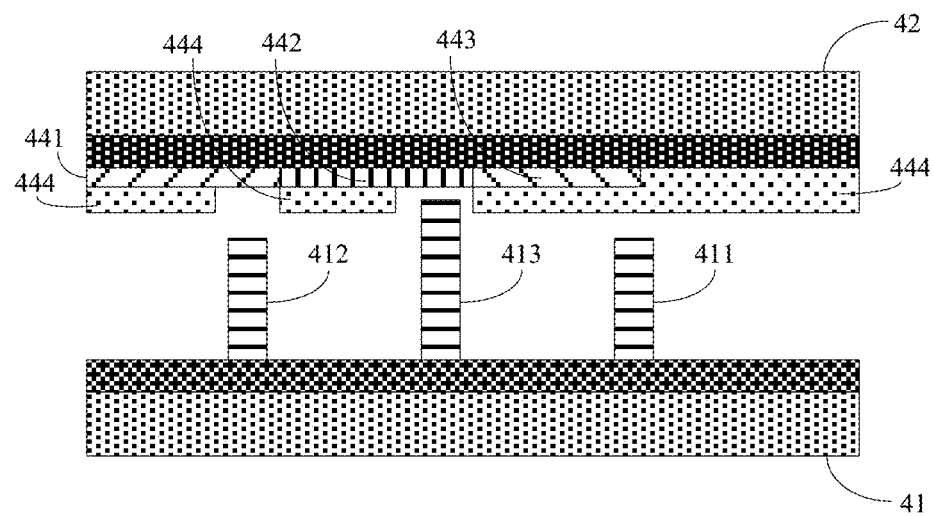
FIG. 8 is a cross sectional schematic view taken along line D-D line of FIG. 7.

With reference to FIG. 7 and FIG. 8, FIG. 7 is a structural schematic view of a fourth embodiment of the color film substrate of the liquid crystal panel of the present invention. FIG. 8 is a cross sectional schematic view taken along D-D line of FIG. 7.

The liquid crystal panel is an RGBW display mode. The color film substrate 42 of the liquid crystal panel has a red, green, blue and white color resists 441, 442, 443, 444, wherein the red, green and blue color resists 441, 442, 443 have the same thickness and the white color resist 444 is thicker than the red color resist 414.

The array substrate 41 has a first spacer 411, a second spacer 412 and a third spacer 413. Further, the first and second spacers 411, 412 have the same height and the white color resist 444 corresponding to the first spacer 411 is thicker than the red color resist 441 corresponding to the second spacer 412.

The third spacer 413 is higher than the second spacer 412, and the color resist corresponding to the third spacer 413 and the color resist corresponding to the second spacer 412 have the same thickness. In the present embodiment, the third spacer 413 corresponds to the green color resist 442.

In the present embodiment, a distance between the third spacer 413 and the color film substrate 42 is shortest, a distance between the first spacer 411 and the color film substrate 42 is longer than that between the third spacer 413 and the color film substrate 42, and a distance between the second spacer 412 and the color film substrate 42 is longest.

When the pressures respectively forced on the color film substrate 42 and/or the array substrate 41 do not exceed the preset pressure, the third spacer 413 touches the color film substrate 42 and provides the supporting function, at the time the second spacer 412 does not touch the color film substrate 42 and does not provide the supporting function.

The first spacer 411 may just touch the color film substrate 42, but does not provide the supporting function or the first spacer 411 may not touch the color film substrate 42.

When the pressures respectively forced on the color film substrate 42 and/or the array substrate 41 exceed the preset pressure and the preset pressure is less than the specific threshold, both of the third spacer 413 and the first spacer 411 touch the color film substrate 42 and provide the supporting functions. The second spacer 412 can touch the color film substrate 42 but does not provide the supporting function, or the second spacer 412 may not touch the color film substrate 42.

When the pressures respectively forced on the color film substrate 42 and/or the array substrate 41 exceed the specific threshold, the third, first and second spacers 413, 411, 412 touch the color film substrate 42 and provide the supporting functions.

To increase the uniformity of positions of the first, second and third spacers 411, 412, 413 corresponding to the side of the color film substrate 42, in the extending direction of the touched surface between the first to third spacers 411, 412, 413 and the color resists, each of the first spacers 411, each of the second spacers 412, or each of the third spacers 413 only corresponds to one color resist.

For example, in the present embodiment, the red color resist 441, the green color resist 442 and blue color resist 443 have the same thickness. As shown in FIG. 7, a second spacer 412 corresponds to a boundary between the red filter unit and green filter unit and a recess area 445 is formed inwardly (shown in a right side of FIG. 7) in the green color resist 442 of the green filter unit, wherein the green color resist 442 corresponds to the second spacer 412. Accordingly, the red color resist 441 of the red filter unit extends to the recess area 445 to only correspond to the red color resist 441 in the extending direction of the touched surface between the second spacer and the color resist, but does not correspond to the green color resist 442 at the same time. Accordingly, the uniformity of the position of the second spacers 412 corresponding to the side of the color film substrate 42 is maintained.

Similarly, in the present embodiment, the third spacer 413 corresponds to a boundary between the green filter unit and the blue filter unit and a recess area 446 is formed inwardly (shown in the right side of FIG. 7) in the blue color resist 443 of the blue filter unit, wherein the blue color resist 443 corresponds to the third spacer 413. The green color resist 442 of the green filter unit extends to the recess area 446 so the third spacer 413 only corresponds to the green color resist 442 but does not correspond to the blue color resist 443 at the same time. Accordingly, the uniformity of the position of the third spacers 413 corresponding to the side of the color film substrate 42 is maintained.

By forming the three different spacers on the array substrate 41, the present embodiment makes that the liquid crystal panel can maintains the thickness thereof under a larger pressure and keeps a clarity of a display frame.

Figure 9:
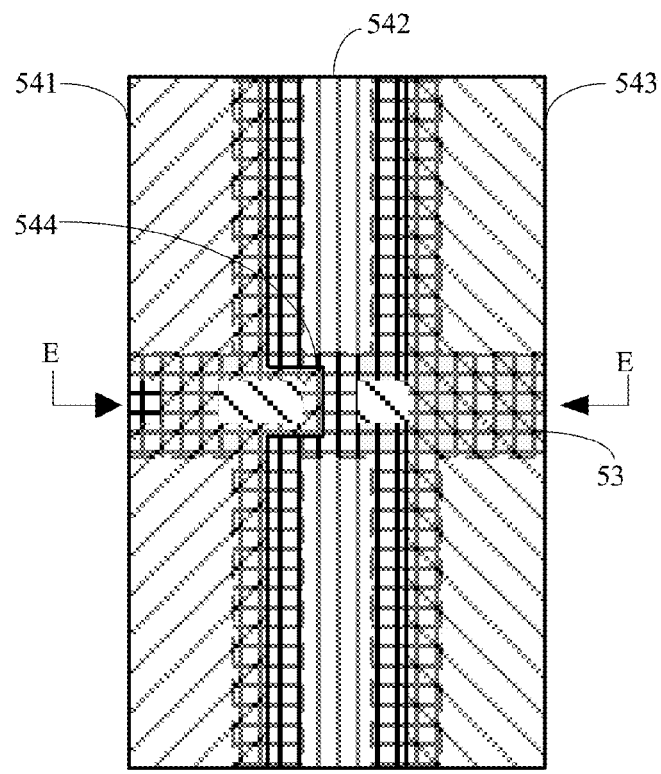
FIG. 9 is a structural schematic view of a fifth embodiment of the color film substrate of the liquid crystal panel of the present invention.
Figure 10:
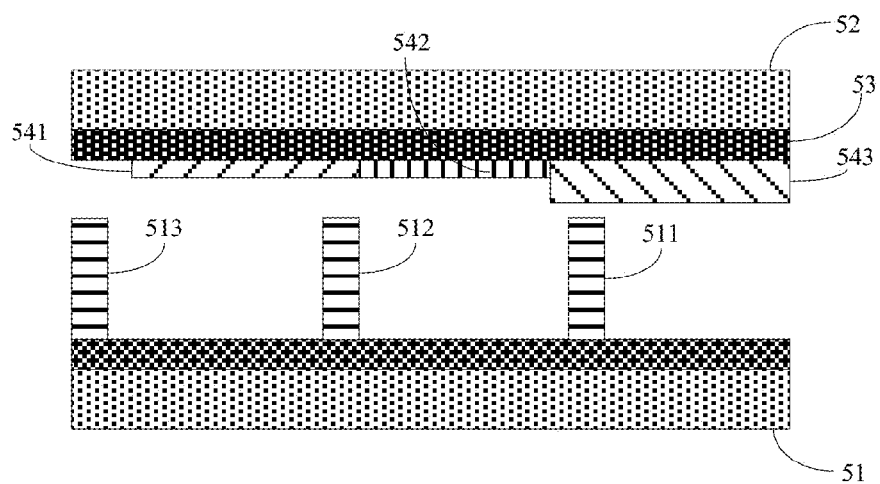
FIG. 10 is a cross sectional schematic view taken along E-E line of FIG. 9.

With reference to FIG. 9 and FIG. 10, FIG. 9 is a structural schematic view of a fifth embodiment of the color film substrate of the liquid crystal panel of the present invention. FIG. 10 is a cross sectional schematic view taken along E-E line of FIG. 9.

The liquid crystal panel of the present embodiment is an RGB display mode, the color film substrate 52 of the liquid crystal panel has the red, green and blue color resists 541, 542, 543 formed thereon, wherein the red and green color resists 541, 542 have the same thickness and the blue color resist 543 is thicker than the red color resist 541.

The array substrate 51 has a first, second and third spacers 511, 512, 513 formed thereon. Further, the first to third spacers 511, 512, 513 have the same height. The first spacer 511 corresponds to the blue color resist 543, the second spacer 512 corresponds to the red color resist 541 and the third spacer 513 corresponds to a black matrix 53 on the color film substrate 52.

For example, the blue color resist 543 is 0.3 μm thicker than the red color resist 541 or the green color resist 542 and the red and green color resists 541, 542 are 0.3 μm thicker than the black matrix 53. Therefore, a height difference between the first and second spacers 511, 512 is 0.3 μm and a height difference between the first and third spacers 511, 513 is 0.6 μm.

In the present embodiment, a distance between the first spacer 511 and the color film substrate 52 is shortest, a distance between the second spacer 512 and the color film substrate 52 is longer than that between the first spacer 511 and the color film substrate 52, and a distance between the third spacer 513 and the color film substrate 52 is longest since the black matrix 53 is formed between the color resists and the color film substrate 52 so a distance from the black matrix 53 to the spacer is longer than a distance from the color resists to the spacer.

When the pressures respectively forced on the color film substrate 52 and/or the array substrate 41 do not exceed the preset pressure, the first spacer 511 touches the color film substrate 52 and provides the supporting function, at the time the third spacer 513 does not touch the color film substrate 52 and does not provide the supporting function. The second spacer 512 may just touch the color film substrate 52, but does not provide the supporting function or the second spacer 512 may not touch the color film substrate 52.

When the pressures respectively forced on the color film substrate 52 and/or the array substrate 51 exceed the preset pressure and the preset pressure is less than the specific threshold, both of the first spacer 511 and the second spacer 512 touch the color film substrate 52 and provide the supporting functions. The third spacer 513 can touch the color film substrate 52 but does not provide the supporting function, or the third spacer 513 may not touch the color film substrate 52.

When the pressures respectively forced on the color film substrate 52 and/or the array substrate 51 exceed the specific threshold, the first, second and third spacers 511, 512, 513 touch the color film substrate 52 and provide the supporting functions.

To increase the uniformity of positions of the first and the second spacers 511, 512 corresponding to a side of the color film substrate 52, in the extending direction of the touched surface between the first spacer 511 or the second spacer 512 and the color resists, each of the first spacers 511 or each of the second spacers 512 only corresponds to one color resist.

For example, in the present embodiment, the red color resist 541 and the green color resist 542 have the same thickness. As shown in FIG. 9, the second spacer 512 corresponds to a boundary between the red filter unit and green filter unit, and a recess area 544 is formed inwardly (shown in a right side of FIG. 9) in the green color resist 542 of the green filter unit, wherein the green color resist 542 corresponds to the second spacer 512. The red color resist 541 of the red filter unit extends to the recess area 544 to only correspond to the red color resist 541 in the extending direction of the touched surface between the second spacer and the color resist, but does not correspond to the green color resist 542 at the same time. Accordingly, the uniformity of the position of the second spacers 512 corresponding to the side of the color film substrate 52 is maintained.

By forming the three different spacers on the array substrate 51, the present embodiment makes that the liquid crystal panel can maintains the thickness thereof under a larger pressure and keeps a clarity of a display frame. Furthermore, in the present embodiment, the spacers with the same height are only formed on the array substrate 51 to achieve a function of a three-segment-type spacer so the fabricating steps are simplified to decrease mask cost and to save materials.

Figure 11:
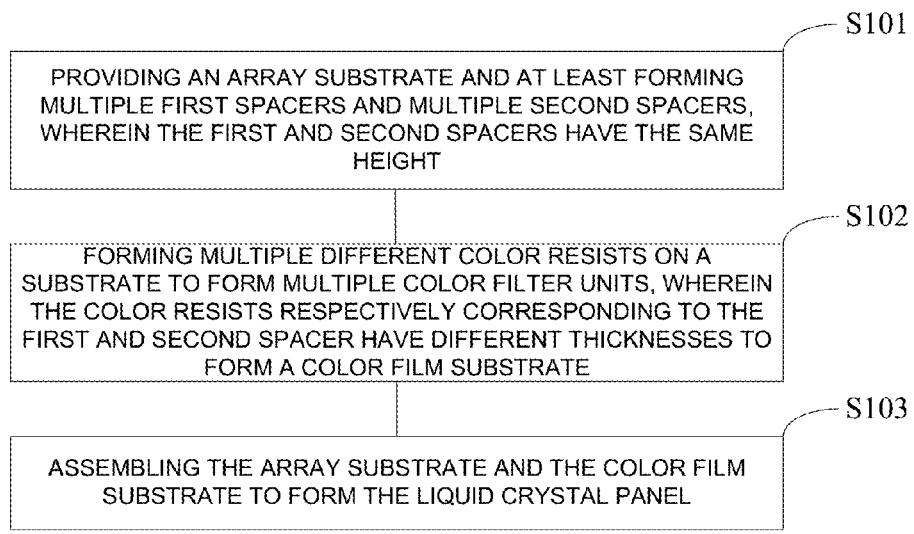
FIG. 11 is a schematic flow chart of a first embodiment of a fabricating method of a liquid crystal panel of the present invention.

With reference to FIG. 11, FIG. 11 is a schematic flow chart of a first embodiment of a fabricating method of a liquid crystal panel of the present invention.

In the fabricating method of the liquid crystal panel of the present invention, the liquid crystal panel may be anyone of the above-mentioned liquid crystal panel. In the present embodiment, the fabricating method of the liquid crystal panel has following steps:

S101: providing an array substrate and at least forming multiple first spacers and multiple second spacers, wherein the first and second spacers have the same height.

In the step of S101, since the first and second spacers have the same height, the first and second isolations are formed at the same time by a regular photo-etching technique and a regular mask. A halftone technique is not required anymore to prevent using an expansive mask and complex fabricating steps of the half tone technique. Therefore, the present invention simplifies fabricating steps and saves cost of the mask.

S102: forming multiple different color resists on a substrate to form multiple color filter units, wherein the color resists respectively corresponding to the first and second spacers having different thicknesses to form a color film substrate.

For example, the color film substrate in the step of S102 is the same as the color film substrate of the first embodiment of the liquid crystal panel, as shown in FIG. 1 and FIG. 2. The liquid crystal panel of the present embodiment is an RGB display mode and the color resists formed on the substrate include the red color resist 141, the green color resist 142 and the blue color resist 143. The red color resist is formed to the red filter unit, the green color resist is formed to the green filter unit and the blue color resist is formed to the blue filter unit. Before forming the color resists, the black matrix 13 is formed on the substrate and the black matrix is formed among the color filter units to separate the color filter units. Parts of the color resists cover the black matrix 13. In the different color resists, the two different color resists respectively corresponding to the first and second spacers have different thicknesses. For example, the first spacer 111 corresponds to the blue color resist 143, the second spacer 112 corresponds to the red color resist 141 and the blue color resist 143 is thicker than the red color resist 141.

S103: assembling the array substrate and the color film substrate to form the liquid crystal panel.

In the step of S103, In the liquid crystal panel assembled by the array substrate and the color film substrate, a distance from the first spacer 111 to the color film substrate 12 is shorter than a distance from the second spacer 112 to the color film substrate 12 since the blue color resist 143 corresponding to the first spacer 111 is thicker than the red color resist 141 corresponding to the second spacer 112.

When the pressures respectively forced on the color film substrate 12 and/or array substrate 11 do not exceed the preset pressure, the first and second spacers 111, 112 still touch the color film substrate 12. At the time, the first and the second spacer 111, 112 provide the support functions.

To distinguish from the prior art, the present invention forms the color resists with different thicknesses on the color film substrate to form the spacers with the same height on the array substrate. Accordingly, the first and second spacers 11, 12 can be formed at the same time by one step of exposure and development with the same exposure intensity. The fabricating steps are simplified to save the cost and the thickness of the liquid crystal panel is maintained to ensure that the liquid crystal panel clearly displays the images.

Figure 12:
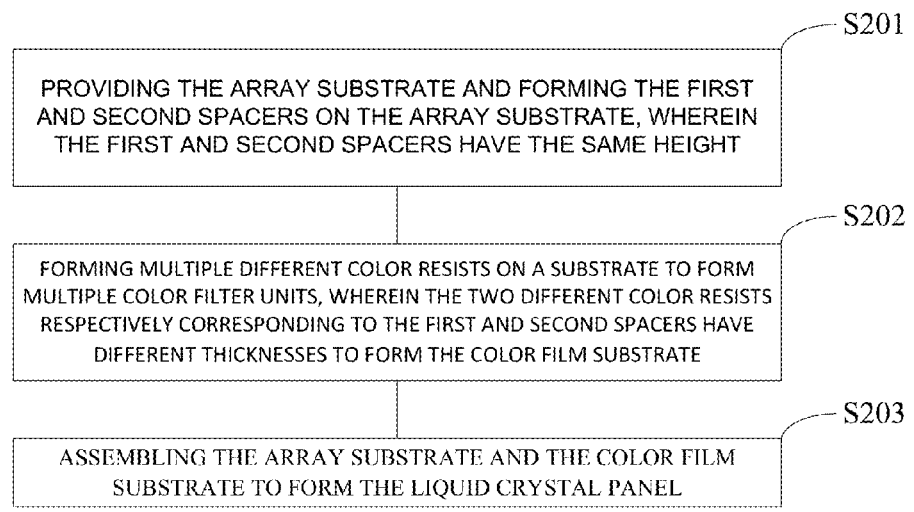
FIG. 12 is a schematic flow chart of a second embodiment of the fabricating method of the liquid crystal panel of the present invention.

With reference to FIG. 12, FIG. 12 is a schematic flow chart of a second embodiment of the fabricating method of the liquid crystal panel of the present invention.

S201: providing the array substrate and forming the first and second spacers on the array substrate, wherein the first and second spacers have the same height.

S202: forming multiple different color resists on a substrate to form multiple color filter units, wherein the two different color resists respectively corresponding to the first and second spacers have different thicknesses to form the color film substrate.

Figure 13:
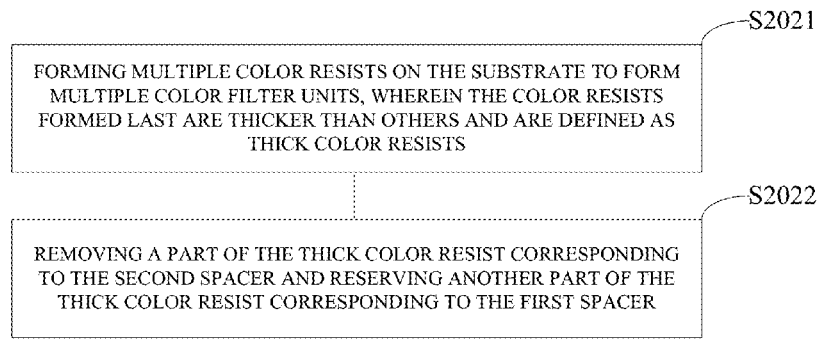
FIG. 13 is a schematic flow chart of S202 step of FIG. 12.

With reference to FIG. 13, FIG. 13 is a schematic flow chart of S202 step of FIG. 12.

S2021: forming multiple color resists on the substrate to form multiple color filter units, wherein the color resists formed last are thicker than others and are defined as thick color resists.

In particular, in the first embodiment of the above-mentioned liquid crystal panel, as shown in FIG. 1 and FIG. 2, the liquid crystal panel is the RGB display mode. The red and green color resists 141, 142 are firstly formed on the substrate and have the same thickness. The blue color resist 143 is formed last. The blue color resist 143 is thicker than the red color resist 141 so the blue color resist 143 is a thick color resist.

In the second embodiment of the liquid crystal panel, as shown in FIG. 3 and FIG. 4, the liquid crystal panel is the RGBW display mode. After the red, green and blue color resists 241, 242, 243 are formed on the substrate, the white color resist 244 is formed on the substrate last. The red, green and blue color resists 241, 242, 243 have the same thickness. The white color resist 244 is thicker than the red color resist 241, so the white color resist 244 is the thick color resist.

S2022: removing a part of the thick color resist corresponding to the second spacer and reserving another part of the thick color resist corresponding to the first spacer.

For example, in the first embodiment of the liquid crystal panel, the blue color resist 143 is coated on the red and green color resists 141, 142 by spin coat, bar coat or blade coat. Then, parts of the blue color resist 143 corresponding to opening areas of the red and green color resists are removed. At the time, another part of the blue color resist 143 corresponding to a standing position of the first spacer 111 is reserved, but another part of the blue color resist 143 corresponding to a standing position of the second spacer 112 is removed. By reserving and removing the parts of the blue color resist 143 corresponding to the standing positions, a height difference is formed. The first and second spacers 111, 112 formed on the side of the array substrate 11 have the same height. Accordingly, two different spacers are formed for an entire structure. In particular, the blue color resist 143 is 0.2 to 0.7 μm thicker than the red/green color resists 141, 142.

Similarly, in the second embodiment of the liquid crystal panel, the white color resist 244 is coated on the red, green and blue color resists 241, 242, 243 by spin coat, bar coat or blade coat. The white color resist 244 is used as the flat layer to provide a flat face for the side of the color film substrate 22 and the flat standing faces for the spacers. The white color resist 244 is 0.2 to 0.7 µm thicker than the red/green/blue color resists 241, 242, 243. A particular thickness difference is determined by the height difference required by the first and second spacers 211, 212. After the white color resist 244 is coated, the white color resist 244 is developed or etched (according to the material thereof). A part of the white color resist 244 corresponding to the standing position of the second spacer 112 is removed and others are reserved so the first and second spacers 211, 212 are formed and have different distances between the first and second spacers 211, 212 and the color film substrate 22.

S203: assembling the array substrate and the color film substrate to form the liquid crystal panel.

For example, in the first embodiment of the liquid crystal panel, the distance between the first spacer 111 and the color film substrate 12 is shorter and the distance between the second spacer 112 and the color film substrate 12 is longer. When the pressures respectively forced on the color film substrate 12 and/or the array substrate 11 do not exceed the preset pressure, only the first spacer 111 touches the color film substrate 12 and provides the supporting function. The second spacer 112 does not touch the color film substrate 12 or the second spacer 112 just touches the color film substrate 12 but does not provide the supporting function. When the pressures respectively forced on the color film substrate 12 and/or the array substrate 11 exceed the preset pressure, both of the first and second spacers 111, 112 touch the color film substrate 12 and provide the supporting functions. In addition, to increase the uniformity of the positions of the first and second spacers 111, 112 corresponding to the side of the color film substrate 12, each of the first spacers 111 or each of second spacers 112 only corresponds to one color resist in the extending direction of the touched surface between each first spacer 111 or each second spacer 112 and the color resist.

In the second embodiment of the liquid crystal panel, the distance between the first spacer 211 and the color film substrate 22 is shorter and the distance between the second spacer 212 and the color film substrate 22 is longer. When the pressures respectively forced on the color film substrate 22 and/or the array substrate 21 do not exceed the preset pressure, only the first spacer 111 touches the color film substrate 22 and provides the supporting function. At the time, the second spacer 212 does not touch the color film substrate 22 so the second spacer 212 does not provide the supporting function; or the second spacer 212 just touches the color film substrate 22 but does not provide the supporting function. When the pressures respectively forced on the color film substrate 22 and/or the array substrate 21 exceed the preset pressure, both of the first and second spacers 211, 212 touch the color film substrate 22 and provide the supporting functions. In addition, to increase the uniformity of the positions of the first and second spacers 211, 212 corresponding to the side of the color film substrate 22, each of the first spacers 211 or each of second spacers 212 only corresponds to one color resist in the extending direction of the touched surface between each first spacer 211 or each second spacer 212 and the color resist.

Figure 14:
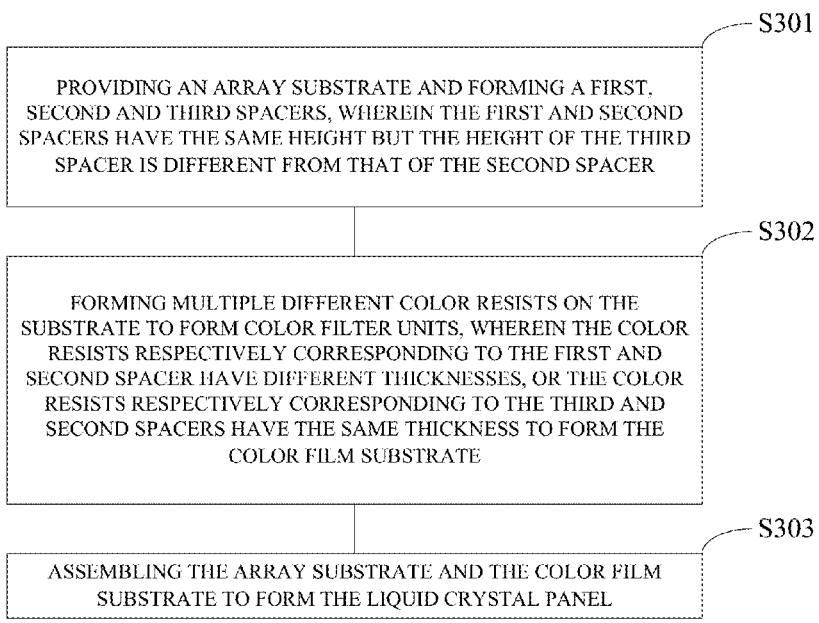
FIG. 14 is a schematic flow chart of a third embodiment of the fabricating method of the liquid crystal panel of the present invention.

With reference to FIG. 14, FIG. 14 is a schematic flow chart of a third embodiment of the fabricating method of the liquid crystal panel of the present invention.

In the present embodiment, the fabricating method of the liquid crystal panel has following steps:

S301: providing an array substrate and forming a first, second and third spacers, wherein the first and second spacers have the same height but the height of the third spacer is different from the height of the second spacer.

In the step, the spacers with different heights are formed by halftone technique.

S302: forming multiple different color resists on the substrate to form color filter units, wherein the color resists respectively corresponding to the first and second spacer have different thicknesses, or the color resists respectively corresponding to the third and second spacers have the same thickness to form the color film substrate.

S303: assembling the array substrate and the color film substrate to form the liquid crystal panel.

The details of fabricating the liquid crystal panel of the present embodiment are same as those of the third and fourth embodiment so here not to describe repeatedly.

Figure 15:
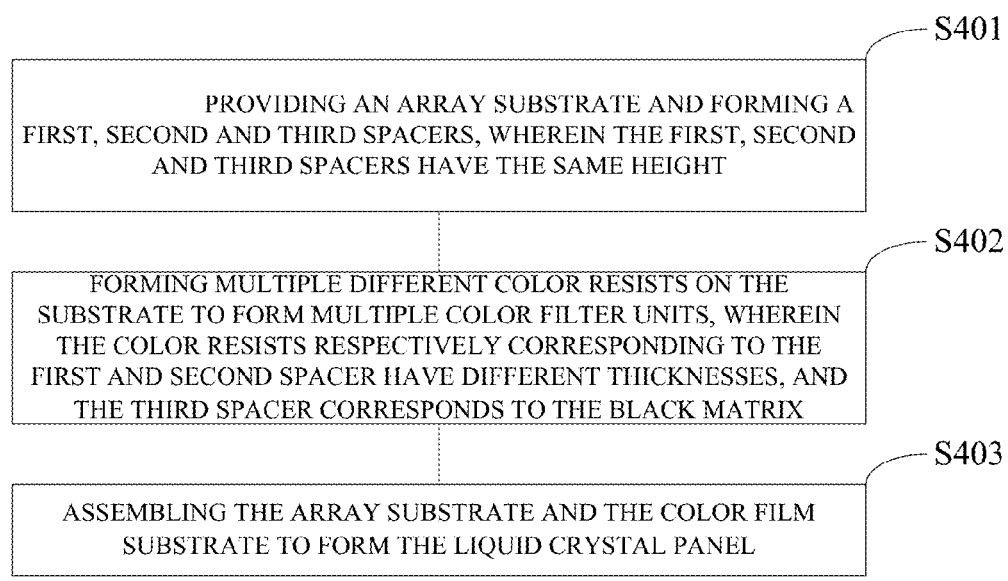
FIG. 15 is a schematic flow chart of a fourth embodiment of the fabricating method of the liquid crystal panel of the present invention.

With reference to FIG. 15, FIG. 15 is a schematic flow chart of a fourth embodiment of the fabricating method of the liquid crystal panel of the present invention.

S401: providing an array substrate and forming a first, second and third spacers, wherein the first, second and third spacers have the same height.

S402: forming multiple different color resists on the substrate to form multiple color filter units, wherein the color resists respectively corresponding to the first and second spacer have different thicknesses, and the third spacer corresponds to the black matrix.

For example, in the fifth embodiment of the liquid crystal panel, the red and green color resists 541, 542 have the same thickness. The blue color resist 543 is thicker than the red color resist 541. The first spacer 511 corresponds to the blue color resist 543. The second spacer 512 corresponds to the red color resist 541. The third spacer 513 corresponds to the black matrix on the color film substrate 52.

For example, the blue color resist 543 is 0.3 µm thicker than the red or green color resist 541, 542. The red and green color resist 541, 542 are thicker than the black matrix 53 to 0.3 µm. Therefore, the height difference between the first and second spacers 511, 512 is 0.3 µm and the height difference the first and third spacers 511, 513 is 0.6 µm.

S403: assembling the array substrate and the color film substrate to form the liquid crystal panel.

In the fifth embodiment of the liquid crystal panel, the distance between the first spacer 511 and the color film substrate 52 is shortest, the distance between the second spacer 512 and the color film substrate 52 is longer than that between the first spacer 511 and the color film substrate 52, and the distance between the third spacer 513 and the color film substrate 52 is longest since the black matrix 53 is formed between the color resists and the color film substrate 52 so a distance from the black matrix 53 to the spacer is longer than the distance from the color resists to the spacer.

When the pressures respectively forced on the color film substrate 52 and/or the array substrate 41 do not exceed the preset pressure, the first spacer 511 touches the color film substrate 52 and provides the supporting function, at the time the third spacer 513 does not touch the color film substrate 52 and does not provide the supporting function. The second spacer 512 may just touch the color film substrate 52, but does not provide the supporting function or the second spacer 512 may not touch the color film substrate 52. When the pressures respectively forced on the color film substrate 52 and/or the array substrate 51 exceed the preset pressure and the preset pressure is less than the specific threshold, both of the first spacer 511 and the second spacer 512 touch the color film substrate 52 and provide the supporting functions. The third spacer 513 can touch the color film substrate 52 but does not provide the supporting function, or the third spacer 513 may not touch the color film substrate 52. When the pressures respectively forced on the color film substrate 52 and/or the array substrate 51 exceed the specific threshold, the first, second and third spacers 511, 512, 513 touch the color film substrate 52 and provide the supporting functions.

By forming the three different spacers on the array substrate 51, the present embodiment makes that the liquid crystal panel can maintains the thickness thereof under a larger pressure and keeps a clarity of a display frame. Furthermore, in the present embodiment, the spacers with the same height are only formed on the array substrate 51 to achieve a function of a three-segment-type spacer so the fabricating steps are simplified to decrease mask cost and to save materials.

Based on the foregoing description, the present invention can simplify the fabricating steps, decreases the mask cost and saves materials.

The above embodiments of the present disclosure are not used to limit the claims of this disclosure. Any use of the content in the specification or in the drawings of the present disclosure which produces equivalent structures or equivalent processes, or directly or indirectly used in other related technical fields is still covered by the claims in the present disclosure.

What is claimed is:

1. A liquid crystal panel, wherein the characteristic is in that the liquid crystal panel comprises an array substrate, a color film substrate and a liquid crystal layer mounted between the array substrate and the color film substrate; wherein:
    the color film substrate forms multiple color resists thereon to form multiple color filter units, wherein the multiple color resists includes a first color resist, a second color resist and a third color resist, a thickness of the third color resist is thicker than a thickness of the first color resist and a thickness of the second color resist;
    the array substrate at least forms multiple first spacers and multiple second spacers, wherein the multiple first spacers and the multiple second spacers are disposed on the array substrate such that a gap is existed between the multiple color resists and each of the multiple first spacers and the multiple second spacers, a height of the first spacer is equal to a height of the second spacer; and
    a thickness of the color resist corresponding to the first spacer is different from a thickness of the color resist corresponding to the second spacer wherein the first spacer is corresponding to the third color resist, the second spacer is corresponding to the first or the second color resist, a third gap existed between the first spacer and the third color resist is smaller than a first gap existed between the second spacer and the first color resist, or is smaller than a second gap existed between the second spacer and the second color resist;
    wherein a portion of the third color resist is disposed on and overlapped with the first color resist or the second color resist.

2. The liquid crystal panel according to claim 1, wherein the characteristic is in that;
    when pressures respectively forced to the color film substrate and/or the array substrate do not exceed a preset pressure, the first spacer touches to the color film substrate to support the color film substrate and the array substrate; and
    when the pressures respectively forced to the color film substrate and/or the array substrate exceed the preset pressure, both of the first and second spacers touch to the color film substrate to provide the color film substrate and the array substrate supporting functions.

3. The liquid crystal panel according to claim 2, wherein the characteristic is in that each of the first spacers or each of the second spacers only corresponds to one color resist in an extending direction of a touched surface between the first spacers and the color resists or between the second spacers and the color resists.

4. The liquid crystal panel according to claim 3, wherein the characteristic is in that when each of the first/second spacers corresponds to a boundary between the two different color filter units, a recess area is formed inwardly in the color resist of one of the two different color filter units, wherein the color resist corresponds to the first/second spacer, and the color resist of the other of the two different color filter units extends to the recess area, so that each of the first/second spacers only corresponds to another color resist in the extending direction of the touched surface.

5. The liquid crystal panel according to claim 1, wherein the characteristic is in that a thickness difference between the two different color resists with different thicknesses is 0.2 to 0.7 μm.

6. The liquid crystal panel according to claim 1, wherein the characteristic is in that the array substrate further forms a third spacer thereon, wherein a height of the third spacer is different the height of the second spacer, and a thickness of the color resist corresponding to the third spacer is the same as the thickness of the color resist corresponding to the first or second spacer.

7. The liquid crystal panel according to claim 1, wherein the characteristic is in that the array substrate further forms a third spacer thereon, wherein the third and second spacers have the same height and the third spacer corresponds to a black matrix on the color film substrate.

8. The liquid crystal panel according to claim 1, wherein the characteristic is in that the color resists comprises a red color resist, a green color resist and blue color resist; or comprises a red color resist, a green color resist, a blue color resist and a white color resist.

* * * * *